US006633026B2

(12) United States Patent
Tuominen

(10) Patent No.: US 6,633,026 B2
(45) Date of Patent: Oct. 14, 2003

(54) WIRELESS POWER TRANSMISSION

(75) Inventor: Juha Tuominen, Pirkkala (FI)

(73) Assignee: Patria Ailon Oy, Tampere (FI)

( * ) Notice: Subject to any disclaimer, the term of this patent is extended or adjusted under 35 U.S.C. 154(b) by 94 days.

(21) Appl. No.: 09/999,412

(22) Filed: Oct. 31, 2001

(65) Prior Publication Data

US 2003/0075670 A1 Apr. 24, 2003

(51) Int. Cl.[7] .................................................. G01J 1/32
(52) U.S. Cl. ...................... 250/205; 455/69; 250/214 R
(58) Field of Search .............................. 250/205, 206, 250/214 R, 214 PR; 359/152, 154, 187, 189, 117; 455/69, 522, 523, 70, 92

(56) References Cited

U.S. PATENT DOCUMENTS

| | | | |
|---|---|---|---|
| 4,078,747 A | 3/1978 | Minovitch | 244/159 |
| 5,450,616 A | * 9/1995 | Rom | 455/69 |
| 6,114,834 A | 9/2000 | Parise | 320/109 |
| 6,407,535 B1 | 6/2002 | Friedman et al. | 322/2 R |

FOREIGN PATENT DOCUMENTS

| | | |
|---|---|---|
| DE | 4034669 | 5/1992 |
| EP | 0734110 | 9/1996 |
| WO | 9813909 | 4/1998 |
| WO | 9921262 | 4/1999 |

* cited by examiner

*Primary Examiner*—Que T. Le
(74) *Attorney, Agent, or Firm*—Ladas & Parry

(57) ABSTRACT

A method for wireless power transmission in a system comprising a power transmitter which in turn comprises a first light source and means for directing the light emitted by the first light source to a desired direction, and at least one power receiver comprising a first photo-detector for receiving the emitted light and for converting it into electric current. A second light source included in the power transmitter is used for transmitting light around the light emitted by the first light source and substantially parallel to it, the intensity of the light being lower than that of the light emitted by the first light source. A second photo-detector included in the power receiver is used for detecting the light emitted by the second light source and for transmitting a control signal to the power transmitter in response to a successful reception of the light emitted by the second light source. The first light source of the power transmitter is switched on in response to the reception of the control signal from the power receiver informing of the reception of the light emitted by the second light source.

23 Claims, 5 Drawing Sheets

WIRELESS POWER TRANSMISSION

FIELD OF THE INVENTION

The invention relates to wireless power transmission and particularly to the utilization of light sources in the transmission.

BACKGROUND OF THE INVENTION

It is known to use wireless power transmission in situations where physical wiring or cabling between a power source and the power consumption point is difficult, if not impossible, to implement. Electromechanical devices conventionally employ inductive elements for power transmission between rotating or otherwise separated components. Inductive power transmission is also used for recharging low-power batteries, for example. In inductive power transmission- the power source and the power consumption or recharging point must be located close to each other and often it is necessary to isolate them galvanically from the environment, because the electromagnetic radiation caused by the induction may interfere with the operation of adjacent devices.

The prior art also knows solutions that employ radio frequency power transmission from a transmitter to one or more receivers, such as radio frequency identification and key cards. These solutions are only suitable for power transmissions of very low level, because it is difficult to direct the total power to be used at specific receiving antennas, and in practice transmission losses are extremely great. In addition, the efficiency of radio frequency transmission degrades rapidly as a function of distance.

Another solution to carry out wireless power transmission is to use a light source as the power transmitter, the transmitted light being then received by a photo-detector and converted into electric current. A light source is easier to direct towards a receiver and therefore a better efficiency can be gained than in radio frequency power transmission, for example. Publications EP 734 110 and U.S. Pat. No. 4,078, 747, for example, describe solutions in which high power lasers are used for the wireless transmission of high currents in the power supply of electric trains and for transferring solar energy generated in space.

A problem with the above-described solutions is that they are not suitable for efficient wireless power transmission in environments occupied by people because the intensity of the laser is extremely dangerous. Even if significantly reduced, the power levels required for sufficiently good efficiency would be such that in case of eye exposure, the laser would at least severely damage vision.

BRIEF DESCRIPTION OF THE INVENTION

It is therefore an object of the invention to provide an improved method and equipment implementing the method to allow the above problems to be solved. The objects of the invention are achieved by a method, system, transmitter and receiver which are characterized by what is stated in the independent claims.

The preferred embodiments of the invention are disclosed in the dependent claims.

An underlying idea of the invention is that power is transmitted wirelessly in a system comprising a power transmitter which in turn comprises a first light source, directing means for directing the light emitted by the first light source to a desired direction, and a second light source emitting light of a substantially lower intensity than that emitted by the first light source, the light emitted by the second light source being transmitted around the light emitted by the first light source and parallel to it. In addition, the system comprises one or more power receivers comprising a first photo-detector for receiving the emitted light and for converting it into electric current, a second photo-detector for detecting the light emitted by the second light source, and transmission means responsive to the detection to transmit a control signal to the power transmitter when the power receiver is receiving light emitted by the second light source. Consequently, when the power transmitter receives from the power receiver a control signal indicating that the power receiver is receiving low intensity light emitted by the second light source, the first light source of the power transmitter is switched on to transmit light surrounded by the light emitted by the second light source. If a disturbance is detected in the light emitted by the second light source, the transmission of the control signal from the power receiver stops and the first light source of the power transmitter is switched off.

An advantage of the method and system of the invention is that the low intensity light emitted by the second light source forms a 'virtual insulator' around the higher intensity light emitted by the first light source whereby, if the virtual insulator is 'broken', i.e. the light emitted by the second light source is blocked, the supply of the high intensity light is switched off immediately and therefore the light cannot cause damage. The procedure of the invention thus enables safe wireless power transmission by means of light sources. A further advantage of the invention is that the power receiver can be included in any device employing substantially low power, such as diverse office equipment, personal or entertainment electronics devices, a wireless power supply for which can be advantageously arranged from one power transmitter located in the same premises. A yet another advantage of the invention is that the power transmitter is arranged to automatically scan its surroundings to find receivers and to store the location of the receivers into its memory, whereby the directing of the transmitters at the receivers is rapid and power can be advantageously supplied alternately to multiple receivers. A still further advantage of the invention is that it enables power transmission of a significantly better efficiency than known solutions, i.e. a power transfer ratio of substantially at least 20%.

BRIEF DESCRIPTION OF THE DRAWINGS

In the following, the invention will be described in greater detail in connection with the preferred embodiments and with reference to the accompanying drawings, in which.

DETAILED DESCRIPTION OF THE INVENTION

Figure 1:
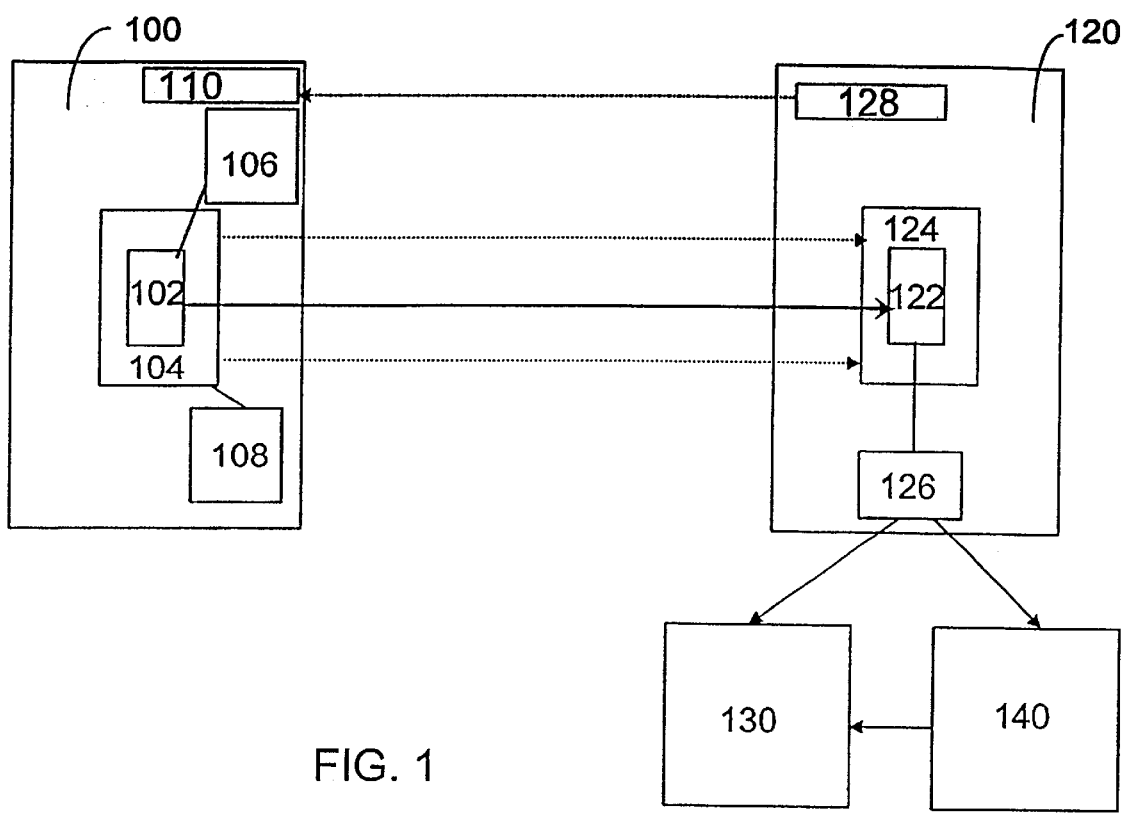
FIG. 1 is a block diagram illustrating a basic structure of a system of the invention.

With reference to FIG. 1, a basic structure of the system will be described. The system comprises a transmitter 100, a receiver 120 connected to an external power-consuming device 130, and charging means 140, typically a battery, for storing electric energy. The transmitter 100 further comprises a first light source 102, a second light source 104 of substantially lower intensity, directing means 106 for directing at least the light emitted by the first light source 102 at the receiver, and scanning means 108 for deflecting at least the light emitted by the second light source 104 into different directions to locate receivers. The transmitter further comprises a receiver 110 for receiving a control signal. The receiver 120 comprises a first photo-detector 122 for receiving the light intensity emitted by the first light source 102, a second photo-detector 124 for receiving the light intensity emitted by the second light source 104, and conducting means 126 for conducting electric current generated from the received light intensity by the first photo-detector to the external device 130 and to the charging means 140. The receiver further comprises a transmitter 128 for transmitting a control signal to the transmitter 100.

The power transmission process in the system is basically the following: the transmitter 100 switches on the second light source 104, the transmission power of which is substantially so low that it will not cause danger to the eyes, for example. If the transmitter 100 has not been directed at the receiver 120 in advance, the directing is carried out by means of the second light source 104 and the scanning means 108. The second light source 104 preferably comprises a plurality of separate low power light sources arranged in a circle around the first light source 102. The light emitted by the second light source, i.e. a set of multiple light sources, can be called a virtual insulator. Alternatively, the virtual insulator can be provided using, a single light source the light emitted by which is expanded by a beam expander to spread in a circle around the first light source 102.

To direct the transmitter at the receiver, the transmitter activates the virtual insulator and starts to scan the environment of the transmitter at the location where it has been placed. The scanning is preferably carried out as a predetermined, two- or three-dimensional systematic path which is followed to cover the space around the transmitter until the virtual insulator comes into contact with the receiver. The second photo-detector 124 of the receiver is arranged to receive light at a wavelength corresponding to the one on which the virtual insulator is transmitted. When the virtual insulator comes into contact with the second photo-detector of the receiver, it is focused on the photo-detector in a manner to be described below in greater detail.

When the virtual insulator has been focused on the second photo-detector of the receiver, the first light source 102 can be switched on in the transmitter, the light emitted by which is thus transmitted surrounded by the virtual insulator, its light intensity carrying out the actual power transmission. The first photo-detector 122 of the receiver, in turn, is correspondingly arranged to receive the light at substantially the same wavelength as it was transmitted by the first light source. The first photo-detector 122 converts the light power it has received into electric current that is further supplied through the connector means 126 to the external device 130 and/or the battery 140. Compared with known solutions, the process of the invention allows significantly better efficiency to be gained in power transmission. Current light sources and photo-detectors allow a power transfer ratio of substantially at least 20% to be gained.

Since the system is meant to be used for example for supplying power to common office equipment and entertainment electronics devices, it is also used in places where people and pets, for example, are present. When light is created in the first light source 102 using high power, the light created may be hazardous to the eyes, for example, even if it were not at the visible wavelength. To prevent this, the system employs the above-described virtual insulator to insulate the light beam meant for the actual power transmission and to inform the system if the insulation 'breaks', i.e. its path is blocked. In that case the power supply of the first light source is switched off immediately. When the obstacle that blocked the path of the virtual insulator has been removed, the power supply process can be restarted by checking first that the virtual insulator is directed at the receiver and, if the virtual insulator operates properly, the light beam to be used for the actual power transmission is switched on.

Figure 2:
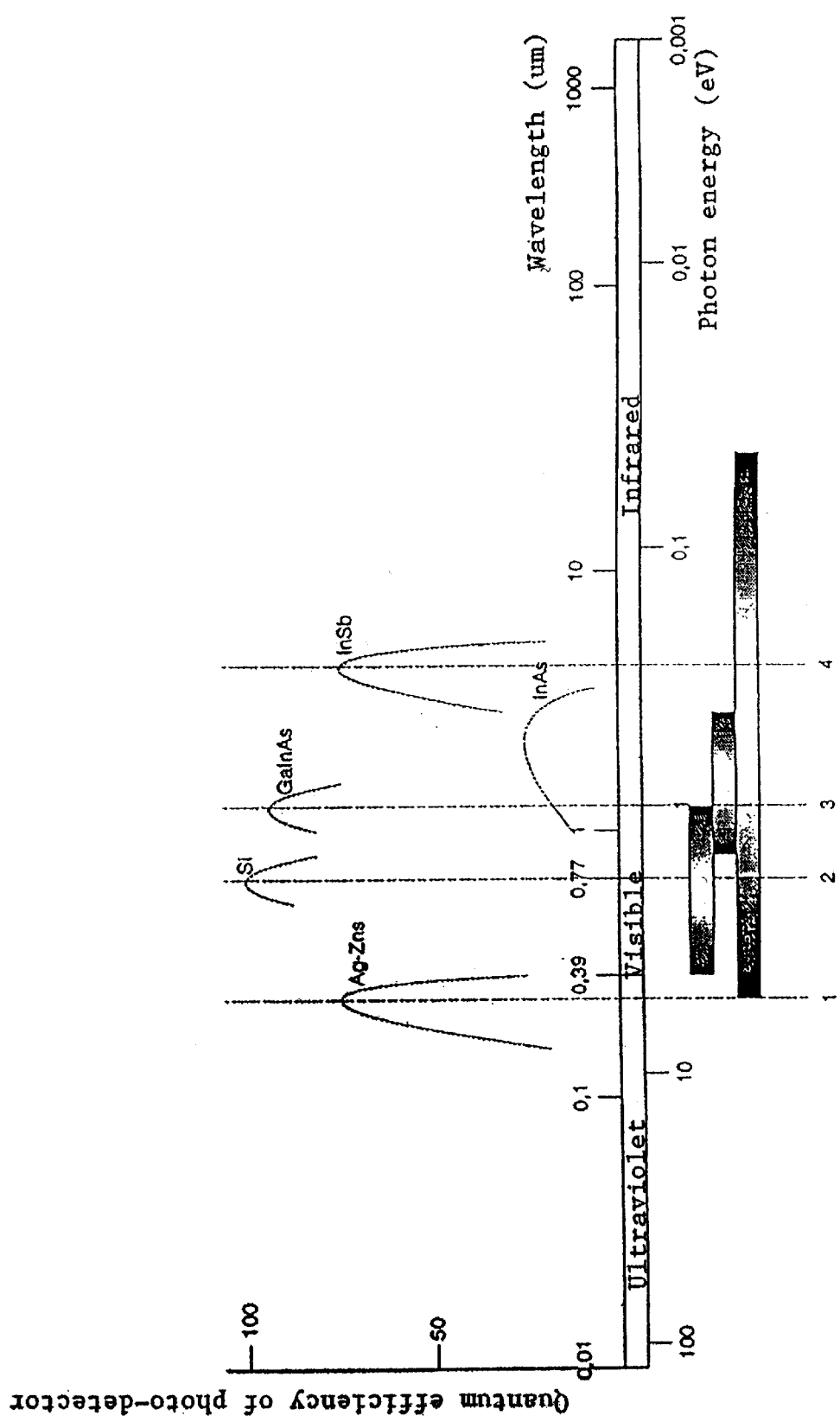
FIG. 2 is a schematic view of the characteristics of some light sources and photo-detectors to be used in the invention.

The light source used in the system can be a light emitting diode LED or laser, for example. The light source and its wavelength must be adjusted to the photo-detector to the used. This is illustrated in the diagram of FIG. 2 which shows the quantum efficiency of photo-detectors made of different materials, i.e. the efficiency of reception at different wavelengths of light. The vertical axis shows the quantum efficiency and the horizontal axis the wavelength of light and the corresponding photon energy transmitted at the wavelength, the photon energy being inversely proportional to the wavelength. In addition, FIG. 2 shows the wavelength ranges of some currently used light sources.

FIG. 2 also shows that if a maximum amount of power is to be transmitted, the shortest wavelength possible is preferred because then the amount of transmitted photon energy increases correspondingly. On the other hand, to allow the transmitted power to be also utilized, the photo-detector to be used must be adjusted to the corresponding wavelength. If the longest wavelength possible, or greatest photon energy, is to be aimed at, the light source can be implemented using a laser, the wavelength of which is substantially 0.30 um, which in turn allows an Ag-Zns photo-detector of a fairly high quantum efficiency to be used. Correspondingly, if the quantum efficiency is to be maximized, an Si-photo-detector operating approximately in the 0.8 um range can be used, in which case the light source may be a LED, laser or possibly a LED operating in the infrared range. Also the other materials mentioned in FIG. 2 can be used to implement the photo-detector of the invention. It is to be noted that this disclosure only describes, by way of example, preferred current light sources and photo-detectors applicable in the invention. However, the implementation of the invention is not restricted to the laser and/or photo-detector to be used or to the wavelengths they utilize, but as technology advances, both the light source and the photo-detector can be implemented using components made of other materials and employing other wavelengths.

When lasers are used, the light to be transmitted, i.e. the light of both the virtual insulator and the power source, can be directed directly at the desired power consumption point. The steering of the light source can be carried out as a laser deflection controlled by a microcircuit, the lasers themselves being directed directly at the receiver. On the other hand, if the light sources are light emitting diodes LED, for example, the directing can be carried out using mirrors to provide what is known as a mirror-controlled deflection. In that case the light source is steered using preferably a sufficient number of mirror servos controlled with a separate control unit. The laser deflection can also be carried out as a mirror-controlled deflection.

Figure 3A:
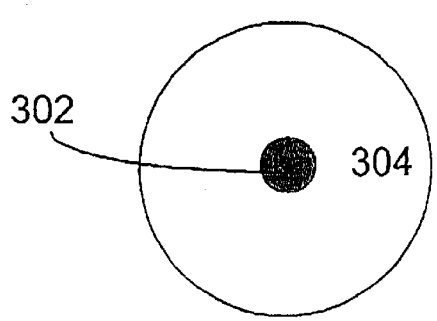
FIGS. 3a and 3b illustrate light beam arrangements according to some embodiments of the invention.
Figure 3B:
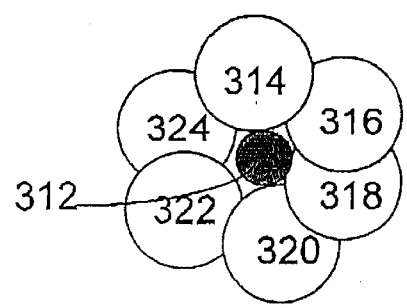

In the directing of the virtual insulator in particular it is always possible to use a beam expander to expand a narrow light beam of a light source to produce a wider, parallel beam. The beam expander comprises two lenses arranged in connection with the transmitter, the first lens spreading the light beam coming from the light source. The second lens is arranged in the vicinity of the first one to collect the light beam spread by the first lens and to refract it to provide a parallel beam. A light beam coming from a light source and having a diameter of 1 mm, for example, can thus be converted into a light beam of a diameter of 5 mm, which is then easier to direct at the photo-detectors of the receiver. The virtual insulator can thus be formed of a single light source, the light emitted by which being expanded with the beam expander to provide a substantially round light curtain surrounding the light emitted by the power source. This is illustrated in FIG. 3a in which a power beam 302 is surrounded by a curtain-like virtual insulator 304. Alternatively, the virtual insulator may be formed using a plural number of light sources which are each expanded with the beam expander to form a round light curtain of at least partly overlapping light beams. This is illustrated in FIG. 3b in which a power beam 312 is surrounded by a plural number of expanded, curtain-like virtual insulator beams 314–324.

The virtual insulator can be advantageously transmitted as light pulses of an extremely high frequency, such as 10–100 MHz. The control of the proper functioning of the virtual insulator is preferably based on a control signal transmitted by the receiver to the transmitter on a continuous basis. If the reception of the control signal at the transmitter stops, the power supply of the first light source is also switched off immediately. The control signal can be implemented to function for example on the basis of reference levels corresponding to logical 0 and 1, which are easy to determine for the light pulses of the virtual insulator. The photo-detector of the virtual insulator is preferably arranged to carry out a logical AND operation for the received light pulses. If the result of the AND operation is 0, there is at least one virtual insulator beam the reception of which has failed. This probably means that the light emitted by at least one light source of the virtual insulator has been blocked. Consequently, the transmission of the control signal from the receiver is stopped immediately. Since the pulses are transmitted at high frequency, the transmission of the control signal is also switched off very rapidly.

Correspondingly, if the virtual insulator is implemented using a single light source, the light emitted by which has been expanded with the beam expander to surround the power beam, the control signal can be controlled on the basis of light pulses received by the photo-detector of the virtual insulator. The received pulses are monitored at the photo-detector of the virtual insulator and if the reception frequency of the pulses changes, i.e. the time between two successively received pulses is substantially at least twice the default time, it is probable that the light emitted by at least one light source of the virtual insulator has been blocked. The transmission of the control signal from the receiver is therefore stopped immediately.

The control signal can be transmitted using for example an omnidirectional LED of a relatively weak intensity, which operates in the infrared range. This kind of a LED is inexpensive, and since it is omnidirectional, the mutual position of the transmitter and the receiver is not essentially significant for the reception of the control signal at the transmitter. Alternatively, the control signal can be transmitted using a low-power radio transmitter, for example. The control signal controlling the transmission of the power beam can be referred to as a security link.

As already stated, the virtual insulator can be used to locate receivers and to direct transmitters at them. In order to be directed at the receiver, the transmitter activates the virtual insulator and starts to scan the environment where the transmitter is placed. Meanwhile, the receivers located in the place and the devices they are connected to are powered by their batteries. The scanning is carried out following a predetermined path covering the entire space surrounding the transmitter until the virtual insulator gets into contact with the receiver. When the virtual insulator gets into contact with the second photo-detector of the receiver, the receiver informs the transmitter accordingly over the security link. Since the actual scanning is preferably carried out at high speed, the directing can be performed such that the security link informs an instantaneous connection made by the virtual insulator, which is naturally received after a short delay at the transmitter. This causes the transmitter to stop the scanning process and move the virtual insulator slowly backwards for the distance it proceeded during the delay, until the connection is re-established. The transmitter then determines the location coordinates of the receiver and, when necessary, continues to search for other receivers in the space.

Figure 4:
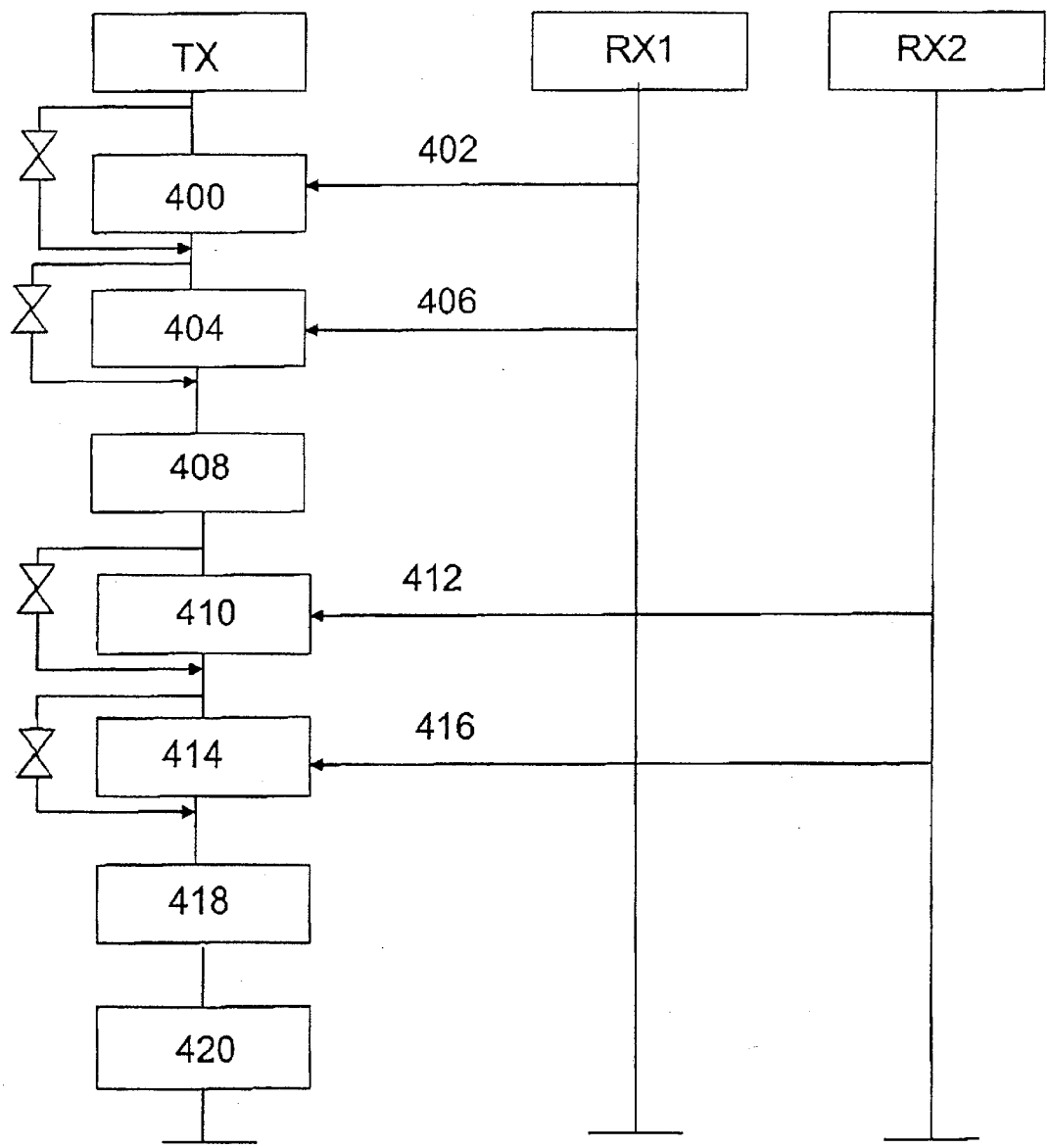
FIG. 4 illustrates a method according to an embodiment of the invention for locating a receiver.

Consequently, it is to be noted that a single transmitter can be advantageously used for supplying power in a wireless manner to a plural number of receivers and devices coupled to them. FIG. 4 shows an MSC diagram illustrating the locating of receivers in a space comprising two receivers. A transmitter TX first activates the virtual insulator and uses it to carry out a high-speed scan (400). The virtual insulator comes into momentary contact with the photo-detector of the virtual insulator of a first receiver RX1, which then sends a security link notification to the transmitter TX (402). The transmitter TX stops the scan and returns slowly to re-focus the virtual insulator on said photo-detector (404). When a correct focusing is achieved, the security link is activated again (406). The transmitter TX determines the coordinates of the photo-detector of the virtual insulator of the first receiver RX1 and stores them into a memory (408), after which the transmitter TX continues to scan the space with the virtual insulator still activated (410). The virtual insulator then comes into a momentary contact with the photo-detector of the virtual insulator of a second receiver RX2, which then rapidly transmits a security link notification to the transmitter TX (412). The transmitter TX stops the scan again and returns slowly to re-focus the virtual insulator on the photo-detector of the second receiver RX2 (414). When a correct focusing is achieved, the second receiver RX2 activates the security link again (416). The transmitter TX determines the coordinates of the photo-detector of the virtual insulator of the second receiver RX2 and stores them into a memory (418), after which the transmitter TX continues to scan the space. After having scanned the entire space, the transmitter TX ends the scan, states that the power consumption points have been found, and deactivates the virtual insulator (420).

If new devices for which wireless transmission is to be arranged are brought into the space in question, the scanning process is started again from the transmitter TX. Alternatively, the transmitter TX may carry out an automated scan at predetermined intervals. The location coordinates of the new devices are determined with a similar scan, and the transmitter TX stores the coordinates into a memory. Since the coordinates of the devices already present in the space have already been stored into the memory of the transmitter TX, these devices can be advantageously ignored in new scanning rounds, which speeds up the scanning of the space.

The actual power transmission to a plural number of receiving devices takes place by supplying power to each consumption point for a predetermined period of time, after which the first light source (power source) of the transmitter is switched off and the virtual insulator is directed at the next consumption point. This can be advantageously carried out without scanning, because the coordinates of the consumption points have already been determined before and they are stored in the transmitter memory. When the virtual insulator is focused on the photo-detector of the virtual insulator of the next receiver, the receiver in question activates the security link, the transmitter being thereby informed that the focusing has been carried out successfully and that it can switch on the first light source (power source). The transmitter again supplies power for a predetermined period of time, switches off the power source and moves on to the next consumption point.

Figure 5:
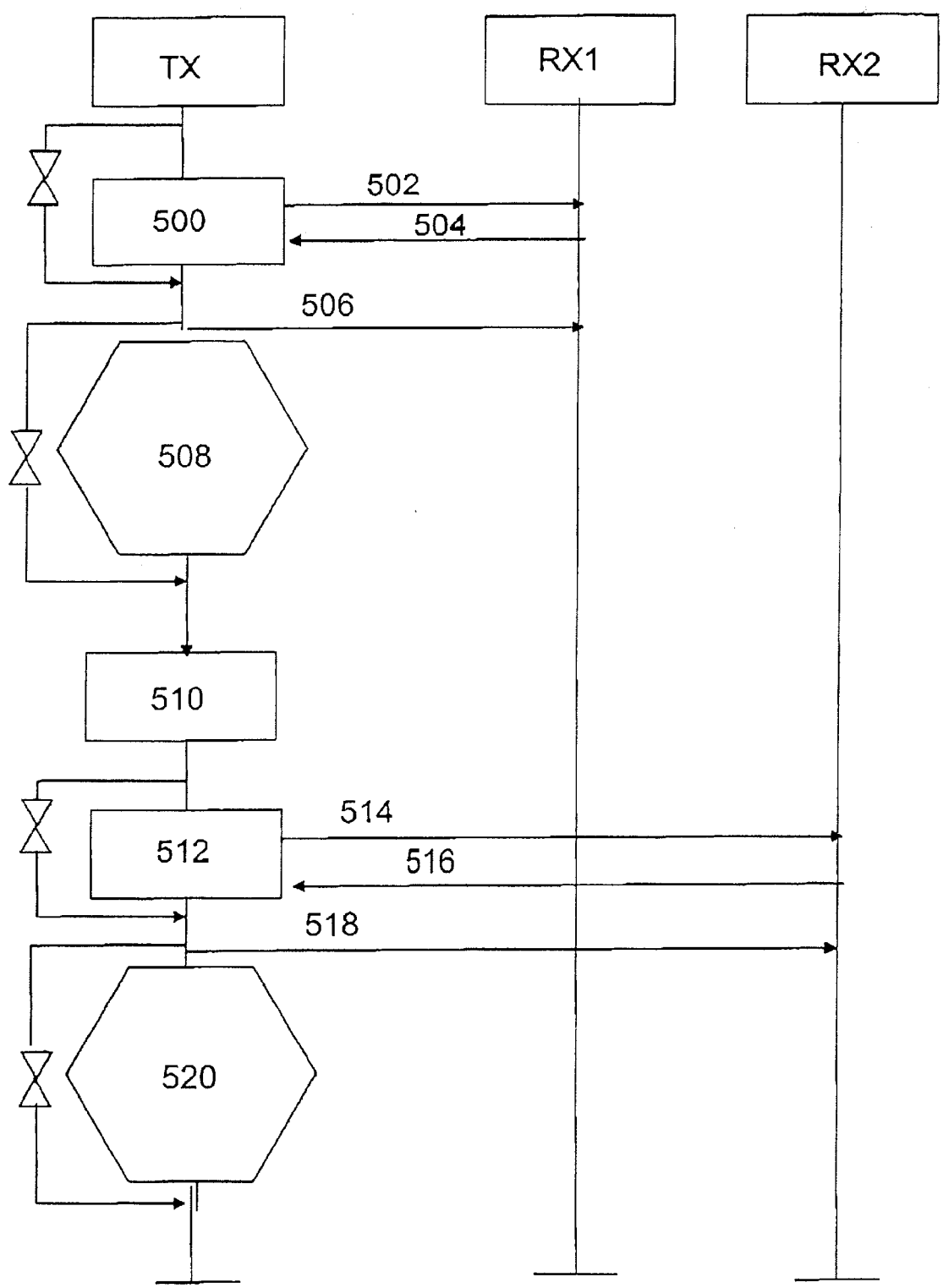
FIG. 5 illustrates a method according to an embodiment of the invention for carrying out power transmission.

This process can be illustrated with the MSC diagram shown in FIG. 5, which illustrates a power transmission process to two separate receivers. In connection with the above-described scanning process, the location coordinates of both receivers RX1 and RX2 have been stored in the memory of the transmitter TX. On the basis of these location coordinates, the transmitter TX directs (500) the activated virtual insulator at the photo-detector (502) of the virtual insulator of the first receiver RX1, in response to which the receiver RX1 activates the security link (504). From the received security link signal the transmitter TX knows that the focusing has been carried out successfully and that the virtual insulator is intact. The transmitter TX therefore switches on the power source and uses the emitted light to transmit power to the first receiver RX1 (506). The transmitter TX emits light for a predetermined period of time, after which the power source is switched off (508). Before the transmitter is directed at the next consumption point, it switches off the virtual insulator as well (510). The transmitter TX is then directed (512) at the second receiver RX2 and the virtual insulator is activated (514), in response to which the receiver RX2 activates the security link (516). Again, on the basis of a received security link signal the transmitter TX knows that the directing has been successfully carried out and that the virtual insulator is intact. The transmitter TX therefore switches on the power source and uses the emitted light to transmit power to the second receiver RX2 (518). The transmitter TX emits light to the receiver RX2 for a predetermined period of time, after which the power source is switched off (520). It is to be noted that power supply period of different lengths can be determined for the different receivers (RX1/RX2). The preferred length of the power supply period of each receiver can be indicated to the transmitter in the form of information attached to the security link signal, for example. Correspondingly, the transmitter TX comprises means for indicating information that determines the power supply period and means for determining the actual receiver-specific power supply period to be applied, which depends on a number of factors, such as the amount of power requested by the receivers, the number of the receivers, the time required for re-directing, etc. The transmitter TX again switches off the virtual insulator and returns to the first receiver RX1 to continue power transmission to it, because there are no other receivers in use in the space in question.

The virtual insulator is preferably implemented using relatively low-power lasers that function at a different wavelength than the actual power source. Such lasers are affordable, and the light they produce is already coherent whereby separate directing means are not needed and the light, which is emitted at a different wavelength, does not cause error situations in the photo-detector of the actual power transmission light. The virtual insulator can be formed using a single light source, the light emitted by which is expanded using a beam expander to form a substantially round light curtain surrounding the light emitted by the power source, as illustrated above in FIG. 3a. Alternatively, the virtual insulator may preferably comprise some lasers, 5 to 7 for example, arranged into a circle around the actual power transmission beam, the laser beams being each expanded with the beam expander to form a round light curtain in which the beams at least partly overlap, as shown in FIG. 3b. The number of lasers is thus sufficient to ensure the safe operation of the virtual insulator such that should the power transmission beam be blocked from whatever direction, the security link and, subsequently, the power transmission beam would be switched off in good time.

According to an embodiment, the security link can be controlled on the basis of light pulses received at the photo-detector of the virtual insulator. The received pulses, for which reference levels corresponding to logical 0 and 1 can be easily determined, are monitored at the photo-detector of the virtual insulator. A logical AND operation is carried out for the received light pulses on the outputs of the photo-detectors of the virtual insulator. If the result of the AND operation is 0, it means that the reception of at least one virtual insulator beam has failed, which probably means that the light emitted by at least-one light source of the virtual insulator has been blocked. The transmission of the control signal from the receiver is then immediately interrupted. Since the pulses are transmitted at a high frequency, the transmission of the control signal is also interrupted extremely rapidly.

The photo-detector of the virtual insulator is preferably ring-shaped, the mutual position of the transmitter and the receiver thus having no impact on the detection of the light beams of the virtual insulator at the detector. On the other hand, the photo-detector ring is preferably as wide as possible to allow the virtual insulator to be detected and the power transmission to be carried out successfully although the received light beams arrive from a very skew angle.

Figure 6A:
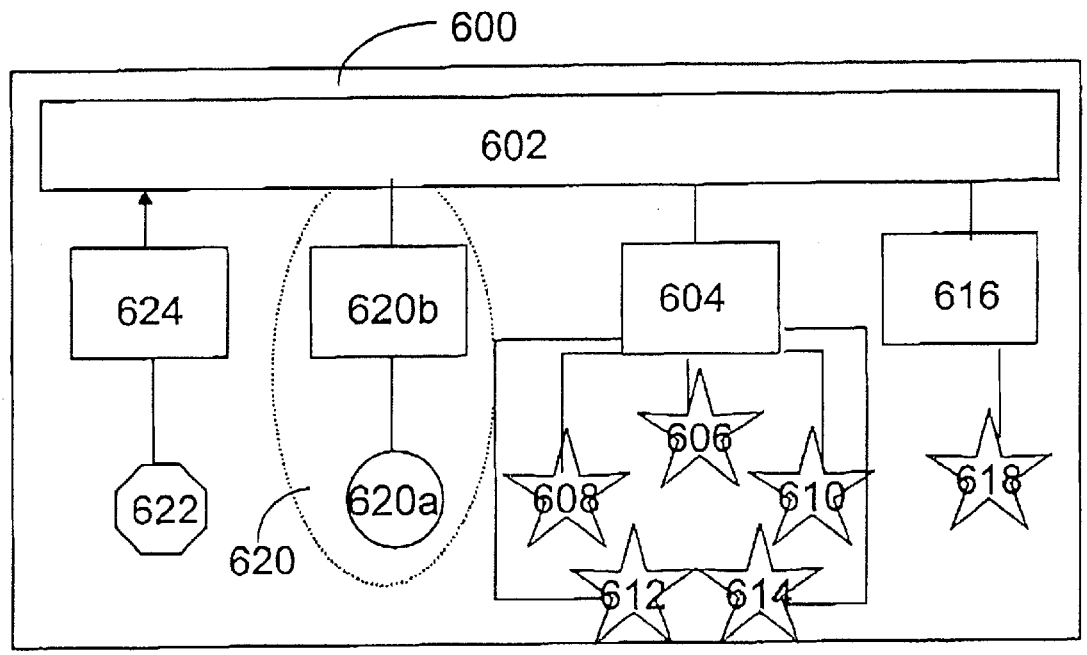
FIGS. 6a and 6b are block diagrams illustrating a transmitter unit and a receiver unit implemented according to an embodiment of the invention.
Figure 6B:
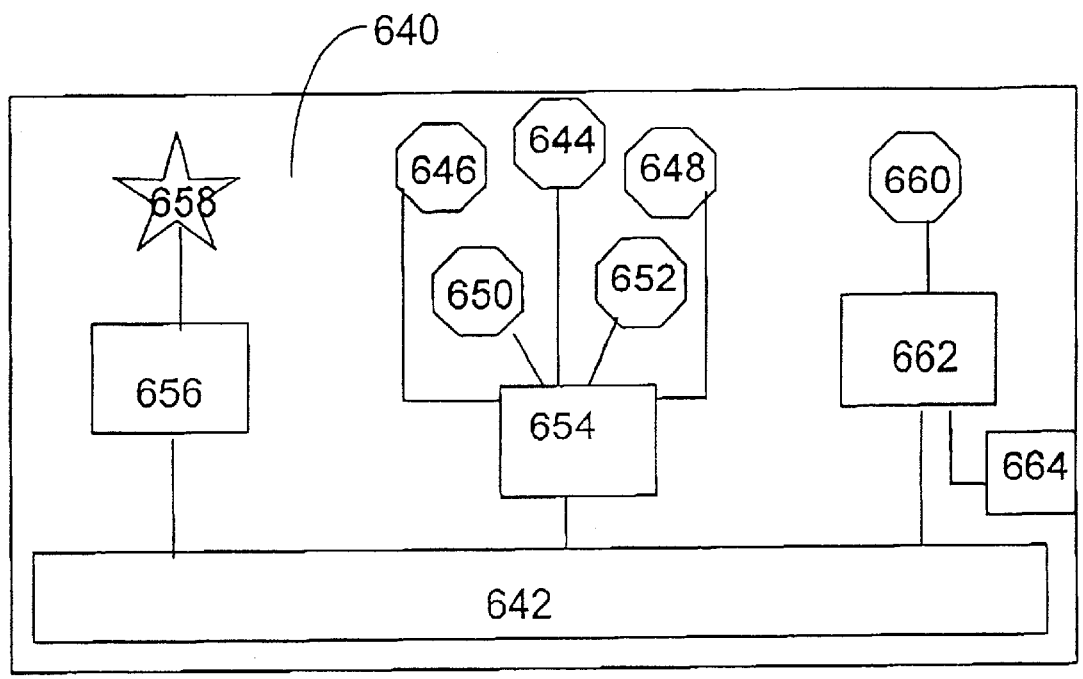

FIGS. 6a and 6b are schematic views of functional blocks of a transmitter unit 600 and a receiver unit 602 of the invention. The transmitter unit 600 comprises a transmitter control logic 602 that can be advantageously implemented for example as programmable ICs, software, or as a combination of these. During the operation of the device, the control logic 602 controls the supply control 604 of the virtual insulator, the supply control controlling the low power lasers 606, 608, 610, 612 and 614 of the virtual insulator. In addition, the control logic 602 controls a supply control circuit 616 of the power laser during the operation of the device, the circuit controlling, in turn, the operation of the actual power source (laser) 618. Further, the control logic 602 controls the deflection of the lasers of both the virtual insulator and the power source to the consumption point aimed at. The deflection is carried out by a deflection unit 620 which can be implemented for example as a laser deflection controlled by a microcircuit, in which case the lasers themselves are directed directly at the receiver, or as a mirror-controlled deflection, the directing being then carried out with mirrors, if light emitting diodes LED, for example, are used as light sources. The deflection unit 620 in question preferably comprises a sufficient number of mirror servos 620a and a control unit 620b controlling them. An essential element in the safe operation of the transmitter unit 600 is a security link receiver 622 from which a received security link signal is supplied through an amplifier 624 to the control unit 602.

FIG. 6b in turn illustrates the functional blocks of a receiver unit 640 of the invention. The receiver unit 640 also comprises a control logic 642 which can be implemented for example as programmable ICs, software or as a combination of these. Laser beams transmitted by low power lasers of the transmitter unit are received from photo-detectors 644, 646, 648, 650 and 652 of the virtual insulator. The laser beams are combined and amplified in an amplifier 654. From the combined signal arriving from the amplifier the control logic of the receiver concludes whether the virtual insulator is intact and, if it is, the logic instructs a supply circuit 656 of the security link to start transmitting the security link signal through the transmitter 658, which is preferably an infra-red LED or a low power radio transmitter, for example. The photo-detector 660 of the power laser serves as the receiver of the actual power to be transmitted, the electric current converted from the light power received from the photo-detector being supplied through a control unit 662 of charging to an interface 664 and from there further on either to an external device or to charging means, such as a battery.

The power transmission system described above can be arranged in connection with diverse devices. For example, the receiver unit can be arranged in connection with different office equipment, such as printers, portable computers, keyboards, wireless network base stations or telephones, or in connection with different personal or entertainment electronics devices, such as radio or stereo equipment, active loudspeakers, phone chargers, etc. In addition, the system can be applied to different monitoring and alarm systems, in which wireless power transmission may be difficult to arrange. These include for example wireless surveillance cameras, motion detectors, diverse control sensors and alarm devices. Naturally the application of the system is not restricted to the above examples.

It is apparent to a person skilled in the art that as technology advances, the basic idea of the invention can be implemented in various ways. The invention and its embodiments are therefore not restricted to the above examples, but they may vary within the scope of the claims.

What is claimed is:

1. A method for wireless power transmission in a system comprising a power transmitter which in turn comprises a first light source and means for directing the light emitted by the first light source to a desired direction, and at least one power receiver which comprises a first photo-detector for receiving the emitted light and for converting it into electric current, the method comprising the steps of transmitting light around the light emitted by the first light source and substantially parallel to it using a second light source included in the power transmitter, the intensity of the light being substantially lower than that of the light emitted by the first light source;

detecting the light emitted by the second light source with a second photo-detector included in the power receiver;

transmitting a control signal from the power receiver to the power transmitter in response to the reception of the light emitted by the second light source; and switching on the first light source of the power transmitter in response to the reception of the control signal from the power receiver informing of the reception of the light emitted by the second light source.

2. A method according to claim 1, comprising transmitting the control signal informing of the reception of the light emitted by the second light source from the power receiver to the power transmitter on a continuous basis, stopping the transmission of the control signal in response to a disturbance detected in the light emitted by the second light source, and switching off the first light source of the power transmitter.

3. A method according to claim 1, comprising transmitting the light emitted by the second light source in pulses, stopping the transmission of the control signal in response to a time interval between two subsequent pulses received by the power receiver being equal to substantially at least twice the inverse value of the transmission frequency of the pulses.

4. A method according to claim 1, wherein the second light source comprises a plural number of separate light sources arranged substantially in a circle around the first light source.

5. A method according to claim 4, comprising combining at the power receiver the light signals emitted by the plural number of separate light sources, stopping the transmission of the control signal in response to at least one of the light signals emitted by the separate light sources missing from the signal combined by the power receiver.

6. A method according to claim 5, wherein the combining at the power receiver is carried out as a logical AND operation.

7. A method according to claim 1, comprising expanding the light emitted by the second light source with a beam expander.

8. A method according to claim 1, comprising deflecting the light emitted by the second light source of the power transmitter along a predetermined path in the space surrounding the power-transmitter to locate the power receivers.

9. A method according to claim 1, comprising transmitting the light of the second light source at an intensity which is substantially so low that it does not damage the eye.

10. A method according to claim 1, comprising connecting the power receiver to an external power-consuming device or charging means, such as a battery, and conducting the electric current generated by the first photo-detector to the external power-consuming device or charging means.

11. A wireless power transmission system comprising a power transmitter, which in turn comprises a first light source and means for directing the light emitted by the first light source to a desired direction, and at least one power receiver, Which in turn comprises a first photo-detector for receiving the emitted light and for converting it into electric current, wherein the power transmitter further comprises a second light source emitting light of a substantially lower intensity than the light emitted by the first light source, the light being arranged to be transmitted around the light emitted by first light source and substantially parallel to it;

the power receiver further comprising a second photo-detector for detecting the light emitted by the second light source and transmission means which are responsive to the detection and configured to transmit a control signal to the power transmitter in response to the reception of the light emitted by the second light source, the power transmitter being configured to switch on the second light source first and, in response to the reception of the control signal from the power receiver informing of the reception of the light emitted by the second light source, the power transmitter is configured to switch on the first light source.

12. A system according to claim 11, wherein the power receiver is configured to transmit the control signal informing of the reception of the light emitted by the second light source to the power transmitter on a continuous basis, to stop the transmission of the control signal in response to a disturbance detected in the light emitted by the second light source, and to switch off the first light source.

13. A system according to claim 11, wherein the light emitted by the second light source is arranged to be transmitted in pulses, the power receiver is configured to stop the transmission of the control signal in response to the time interval between two subsequent pulses received by the power receiver being equal to at least twice the inverse value of the transmission frequency of the pulses.

14. A system according to claim 11, wherein the second light source comprises a plural number of separate light sources arranged substantially in a circle around the first light source.

15. A system according to claim 14, wherein the power receiver is configured to combine the light signals emitted by the plural number of separate light sources, to stop the transmission of the control signal in response to at least one of the light signals emitted by the separate light sources missing from the signal combined by the power receiver.

16. A system according to claim 15, wherein the power receiver is configured to carry out the combining as a logical AND operation.

17. A system according to claim 11, wherein the light emitted by the second light source is arranged to be expanded by a beam expander.

18. A system according to claim 11, wherein the power transmitter comprises deflection means for deflecting the light emitted by the second light source along a predetermined path in the space surrounding the power transmitter to locate the power receivers.

19. A system according to claim 11, wherein the intensity of the light emitted by the second light source is substantially so low that it does not damage the eye.

20. A system according to claim 11, wherein the power receiver is configured to be connected to an external power-consuming device or charging means, such as a battery, and the power receiver comprises conducting means for conducting the electric current generated at the first photodetector to the external power-consuming device or charging means.

21. A system according to claim 11, wherein the light sources are lasers or light emitting diodes (LED).

22. A power transmitter for wireless power transmission, the transmitter comprising a first light source, means for directing the light emitted by the first light source to a desired direction, and a second light source, the light emitted by which is of a substantially lower intensity than that emitted by the first light source and arranged to be transmitted around the light emitted by the first light source and substantially parallel with it, wherein the power transmitter is configured to receive an indication from the power receiver informing of the reception of the light emitted by the second light source, the power transmitter is configured to switch on the second light source first and, in response to an indication received from the power receiver informing of the reception of the light emitted by the second light source, the power transmitter is configured to switch on the first light source.

23. A power receiver which comprises a first photodetector for receiving light emitted by a first light source and for converting it into electric current, a second photodetector for detecting the light emitted by a second light source, and transmission means which are responsive to said detection and configured to transmit to the power transmitter an indication informing of the reception of the light emitted by the second light source.

* * * * *

UNITED STATES PATENT AND TRADEMARK OFFICE
CERTIFICATE OF CORRECTION

PATENT NO. : 6,633,026 B2  Page 1 of 1
DATED : October 14, 2003
INVENTOR(S) : Juha Tuominen It is certified that error appears in the above-identified patent and that said Letters Patent is hereby corrected as shown below:

Title page,
Item [*] Notice, "94" should read -- 99 -- and before item [51], insert
-- [30] Foreign Application Priority Data Oct. 24, 2001 (FI) .... 20012062 --.

Signed and Sealed this

Twenty-seventh Day of January, 2004

JON W. DUDAS
*Acting Director of the United States Patent and Trademark Office*